United States Patent
Kamboh et al.

(10) Patent No.: US 7,240,123 B2
(45) Date of Patent: Jul. 3, 2007

(54) DISTRIBUTED ROUTING CORE

(75) Inventors: Ameel M. Kamboh, Billerica, MA (US); Faruq T. Rahman, Nashua, NH (US); Raghavendran Venkatraman, Nashua, NH (US)

(73) Assignee: Nortel Networks Limited (CA)

( * ) Notice: Subject to any disclaimer, the term of this patent is extended or adjusted under 35 U.S.C. 154(b) by 935 days.

(21) Appl. No.: 10/016,777

(22) Filed: Dec. 10, 2001

(65) Prior Publication Data

US 2003/0110289 A1 Jun. 12, 2003

(51) Int. Cl.
G06F 15/173 (2006.01)
G06F 15/16 (2006.01)
H04L 12/28 (2006.01)

(52) U.S. Cl. ............ 709/238; 709/230; 709/232; 370/351; 370/395.5

(58) Field of Classification Search ........... 709/238, 709/229, 242, 230, 232; 370/351, 395.5
See application file for complete search history.

(56) References Cited

U.S. PATENT DOCUMENTS

| | | | | |
|---|---|---|---|---|
| 5,274,631 A | * | 12/1993 | Bhardwaj | 370/401 |
| 5,515,376 A | * | 5/1996 | Murthy et al. | 370/402 |
| 5,530,703 A | * | 6/1996 | Liu et al. | 370/255 |
| 5,541,911 A | * | 7/1996 | Nilakantan et al. | 370/422 |
| 5,550,816 A | * | 8/1996 | Hardwick et al. | 370/397 |
| 5,566,170 A | * | 10/1996 | Bakke et al. | 370/392 |
| 5,720,032 A | * | 2/1998 | Picazo et al. | 709/250 |
| 5,802,054 A | * | 9/1998 | Bellenger | 370/401 |
| 5,909,686 A | * | 6/1999 | Muller et al. | 707/104.1 |
| 5,964,841 A | * | 10/1999 | Rekhter | 709/242 |
| 5,999,530 A | * | 12/1999 | LeMaire et al. | 370/390 |
| 6,067,569 A | * | 5/2000 | Khaki et al. | 709/224 |
| 6,078,963 A | * | 6/2000 | Civanlar et al. | 709/238 |
| 6,085,235 A | * | 7/2000 | Clarke et al. | 709/219 |
| 6,147,976 A | * | 11/2000 | Shand et al. | 370/254 |
| 6,282,575 B1 | * | 8/2001 | Lin et al. | 709/244 |
| 6,332,198 B1 | * | 12/2001 | Simons et al. | 370/217 |
| 6,389,479 B1 | * | 5/2002 | Boucher et al. | 709/243 |
| 6,393,487 B2 | * | 5/2002 | Boucher et al. | 709/238 |
| 6,427,171 B1 | * | 7/2002 | Craft et al. | 709/230 |
| 6,427,173 B1 | * | 7/2002 | Boucher et al. | 709/238 |
| 6,434,620 B1 | * | 8/2002 | Boucher et al. | 709/230 |
| 6,449,256 B1 | * | 9/2002 | Varghese et al. | 370/238 |
| 6,542,496 B1 | * | 4/2003 | Hirota et al. | 370/351 |
| 6,611,522 B1 | * | 8/2003 | Zheng et al. | 370/395.21 |

(Continued)

OTHER PUBLICATIONS

Culler et al. Parallel Computer Architecture: A Hardware/Software Approach. Morgan Kaufmann Publishers. San Francisco, CA. 1999. Chapter 10. 749-828.*

(Continued)

*Primary Examiner*—Jason Cardone
*Assistant Examiner*—Jeffrey R. Swearingen
(74) *Attorney, Agent, or Firm*—McGuinness & Manaras LLP (57) ABSTRACT

A routing device for forwarding data packets in a communication system includes a set of routing processors at least one interface that receives and transmits data packets and a routing table manager that maintains a forwarding table of routes provided by the set of routing processors. Each routing processor is associated with a routing protocol that determines a set of routes. The routing device may also include a set of fast forward engines that forward a data packet based on the forwarding table. The routing table manager may be implemented on a separate processor than each routing processor.

19 Claims, 4 Drawing Sheets

U.S. PATENT DOCUMENTS

| | | | |
|---|---|---|---|
| 6,658,480 B2 * | 12/2003 | Boucher et al. | 709/239 |
| 6,658,481 B1 * | 12/2003 | Basso et al. | 709/243 |
| 6,760,775 B1 * | 7/2004 | Anerousis et al. | 709/238 |
| 6,976,149 B1 * | 12/2005 | Brandt et al. | 711/220 |
| 7,023,845 B1 * | 4/2006 | Simons et al. | 370/389 |

OTHER PUBLICATIONS

Srinivasan, V. et al. "Fast and Scalable Layer Four Switching". ACM SIGCOMM Computer Communication Review. Vol. 28, Issue 4, pp. 191-202. Oct. 1998.*

Estrin, D. et al. "Source Demand Routing: Packet Format and Forwarding Specification (Version 1)." RFC 1940. May 1996.*

O'Connor, M. et al. "The iFlow Address Processor". IEEE Micro. Mar.-Apr. 2001. vol. 21, Issue 2, 16-23.*

Waldvogel, Marcel et al. "Scalable High-Speed Prefix Matching." ACM Transactions on Computer Systems. vol. 19, No. 4, Nov. 2001. 440-82.*

Kohler, Eddie et al. "The Click Modular Router". ACM Transactions on Computer Systems. vol. 18, No. 3, Aug. 2000. 263-97.*

* cited by examiner

DISTRIBUTED ROUTING CORE

FIELD OF THE INVENTION

The invention generally relates to communication systems and, more particularly, the invention relates to devices used to forward data across communication systems.

BACKGROUND OF THE INVENTION

In today's information age it is typical for computers to be internetworked over a communication network. Communication networks utilize many data forwarding devices (e.g., routers and switches) to forward data messages (also referred to herein as packets) within the communication network. A router acts as a gateway between two or more network segments, and processes packets according to addressing information contained in the packets. Among other things, such forwarding devices include both routing software and a corresponding routing hardware platform that cooperate to forward packets to their appropriate destinations.

Figure 1:
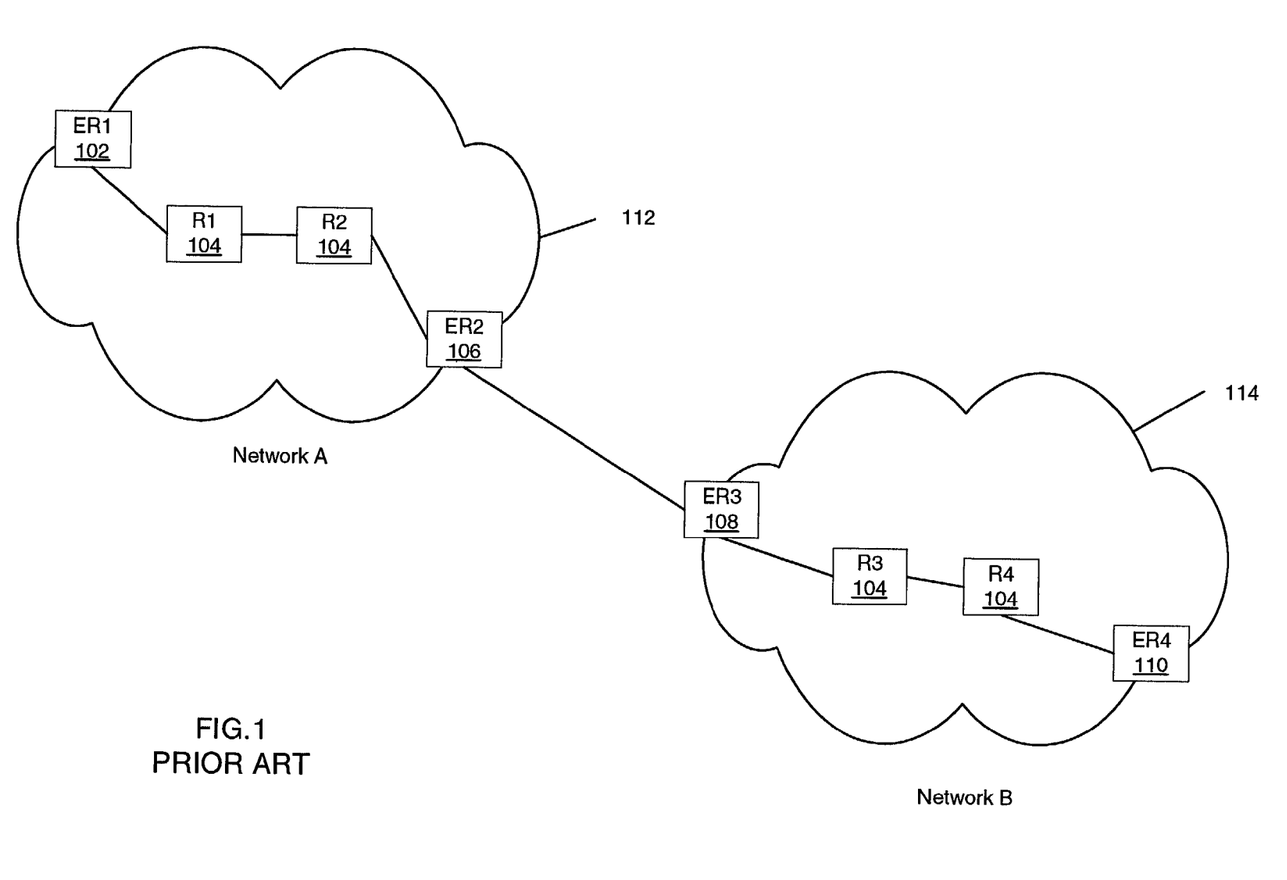
FIG. 1 is a schematic block diagram of a communication network including routers for forwarding data packets.

FIG. 1 shows a communication system including a number of routers. The communication system includes edge routers (ER1 (102), ER2 (106), ER3 (108), ER4 (110)) and routers R1 (104) and R2 (104) within Network A (112) and routers R3 (104) and R4 (104) within Network B (114). An edge router, such as ER1 (102), routes data between local networks, such as Network A (112) and Network B (114) and to the routers within particular networks. Typically, data packets are routed through a communication network using a networking protocol such as the Internet Protocol (IP).

When a router (e.g., router ER1 (102)) receives a packet from a particular network segment, the router determines whether to drop the packet, process the packet, or forward the packet. Specifically, the router may drop the packet if the packet is destined for the same network segment from which it was received. The router may forward the packet if the packet is destined for a different network segment. The router may process the packet if the packet is destined for the router itself. In order to forward packets, a router uses a routing protocol, such as Open Shortest Path First (OSPF) or Roufing Information Protocol (RIP), to determine network routes and uses the network routes to build and maintain a forwarding table. The forwarding table includes forwarding entries mapping each destination address to a corresponding router interface based upon the network routes. Alternatively, packets of information may be routed using a label switching protocol such as multiprotocol label switching (MPLS). Label switching allows a packet to be transported across a network domain using labels rather than the network layer address.

Often when processing routes in a communication network, bottlenecks may occur at a router or routers within the network due to limited resources. For example, when only one processor in a device is used for multiple routing tasks, the processor spends a significant portion of time waiting on other tasks. The exponential growth of today's communication networks (e.g., the Internet) demands scalability beyond what current architectures are able to sustain. Routers often become obsolete prematurely because they are unable to handle the growth of the Internet. Network management complexity is holding up mass deployment of networking products. The tolerance for downtime due to hardware and software upgrades may be very expensive. Software solutions can become very complicated and are difficult to manage as the performance needs of the routing device grow.

SUMMARY OF THE INVENTION

In accordance with one aspect of the invention, a routing device for forwarding data packets in a communication system includes at least one interface for receiving and transmitting data packets and a set of routing processors coupled to the at least one interface. Each routing processor is associated with a routing protocol for determining a set of routes. A routing table manager is coupled to the set of routing processors for maintaining a forwarding table of routes provided by the set of routing processors. In one embodiment, the routing device further includes a set of fast forward engines coupled to the at least one interface and the routing table manager for forwarding a data packet based on the forwarding table. The routing table manager may be implemented on a separate processor than each routing processor in the set of routing processors.

In another embodiment, each routing processor includes memory. The memory may include RAM, cache memory and queue memory. The routing table manager processor may also include memory in which the forwarding table is stored. In a further embodiment, the routing device further includes a control data module for receiving and processing control data messages from a control data bus and a routing data module for receiving and processing routing data messages from a routing data bus. The control data module and the routing data module may be implemented on the same processor.

In accordance with another aspect of the invention, an apparatus for aggregating and maintaining routing information for a routing device that forwards data packets in a communication network includes an input for receiving routing information associated with a set of routing protocols and a set of routing protocol processors. Each routing protocol processor is associated with a routing protocol in the set of routing protocols and determines a set of routes for a particular routing protocol. A forwarding table is coupled to the routing protocol processors for maintaining a list of routes provided by the set of routing protocol processors.

In one embodiment, the apparatus further includes a routing table manager for updating the forwarding table. Each routing protocol may include memory. The memory may include RAM, cache memory and queue memory. The routing table manager may be implemented on a separate processor than each routing protocol processor in the set of routing protocol processors.

In accordance with another aspect of the invention, a communication system comprises at least one routing device for forwarding data packets and the routing device includes at least one interface for receiving and transmitting data packets, a set of routing processors coupled to the at least one interface and a routing table manager for maintaining a forwarding table of routes provided by the set of routing processors. Each routing processor is associated with a routing protocol for determining a set of routes. The routing device may further include a set of fast forward engines for forwarding a data packet based on the forwarding table. In one embodiment, the routing table manager is implemented on a separate processor than each routing processor in the set of routing processors.

In a further embodiment, the routing device further includes a control data module that receives and processes control data messages from a control data bus and a routing data module that receives and processes routing data messages from a routing data bus. The control data module and the routing data module may be implemented on the same processor. In another embodiment, each routing processor includes memory

BRIEF DESCRIPTION OF THE DRAWINGS

The foregoing description of various embodiments of the invention should be appreciated more fully from the following further description thereof with reference to the accompanying drawings wherein.

DESCRIPTION OF PREFERRED EMBODIMENTS

In an embodiment of the present invention, a routing device is provided that includes a distributed route-processing core to reduce the bottlenecks that may occur in routing decisions. Each routing protocol supported by the routing device is implemented on a separate processor. Each processor includes its own memory and other configurable resources. Accordingly, routing decisions are not handled on the same processor. The distributed route-processing core increases performance and scalability of the routing device.

Figure 2:
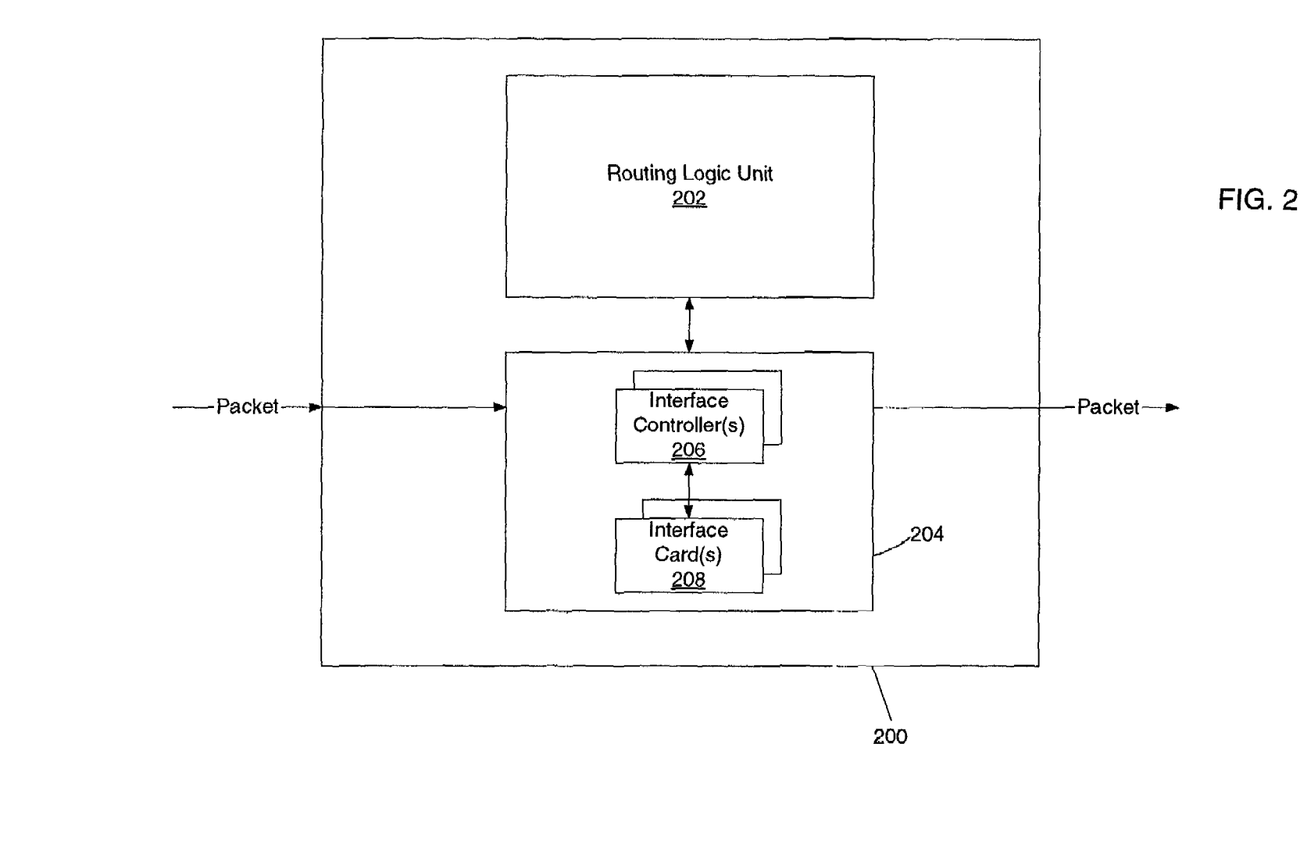
FIG. 2 is a schematic block diagram of a routing device in accordance with an embodiment of the invention.

As discussed above with respect to FIG. 1, a communication system includes edge routers that are used to route data packets between one or more local networks. FIG. 2 is a schematic block diagram of a routing device (e.g., a router) in accordance with an embodiment of the invention. Router 200 includes a routing logic unit 202 and an interface logic unit 204. In one embodiment, the router is implemented as a NEBS-compliant chassis that includes at least one routing core shelf that includes the routing logic and at least one interface shelf that includes the interface logic. Each shelf may house a plurality of processor cards and a power supply. The chassis can be expanded to include a plurality of routing core shelves and a plurality of interface shelves.

Interface logic unit 204 includes a plurality of interface controller cards 206 and a plurality of interface cards 208. The interface logic unit 204 receives data (or information) packets and transmits the data packets based on routing information provided by the routing logic unit 202. When a data packet is received by the router 200, an interface card 208 will process the data packet before sending the data packet to an interface controller card 206. For example, each interface card 208 may include a processor that converts incoming data to IP packets before sending the information to an interface controller 206. Each interface card 208 may handle the ingress and egress of packets associated with one or more routing protocols. The interface cards may be, for example, ATM line cards, Gigabit Ethernet cards, Chanelized T3/E3 or POS interfaces.

Once an interface controller 206 receives a data packet, it directs the packet to the routing logic unit 202, where the destination/forwarding information for the packet is determined. For ingress, the interface controller 206 may attach an origination header to the front of the packet. Once the routing unit logic 202 has determined the forwarding path (or next hop) for the data packet, it returns the data packet to an interface controller 206 to be forwarded. For egress, the interface controller 206 will send the packet to the correct interface card 208 and port. In addition, an interface controller 206 may be used to negotiate the PPP (Point-to-Point Protocol) or MLPPP (Multilink Point-to-Point Protocol) communications for each interface. Interface controller 206 may also be used to boot (or start up) the interface card 208 processors.

Figure 3:
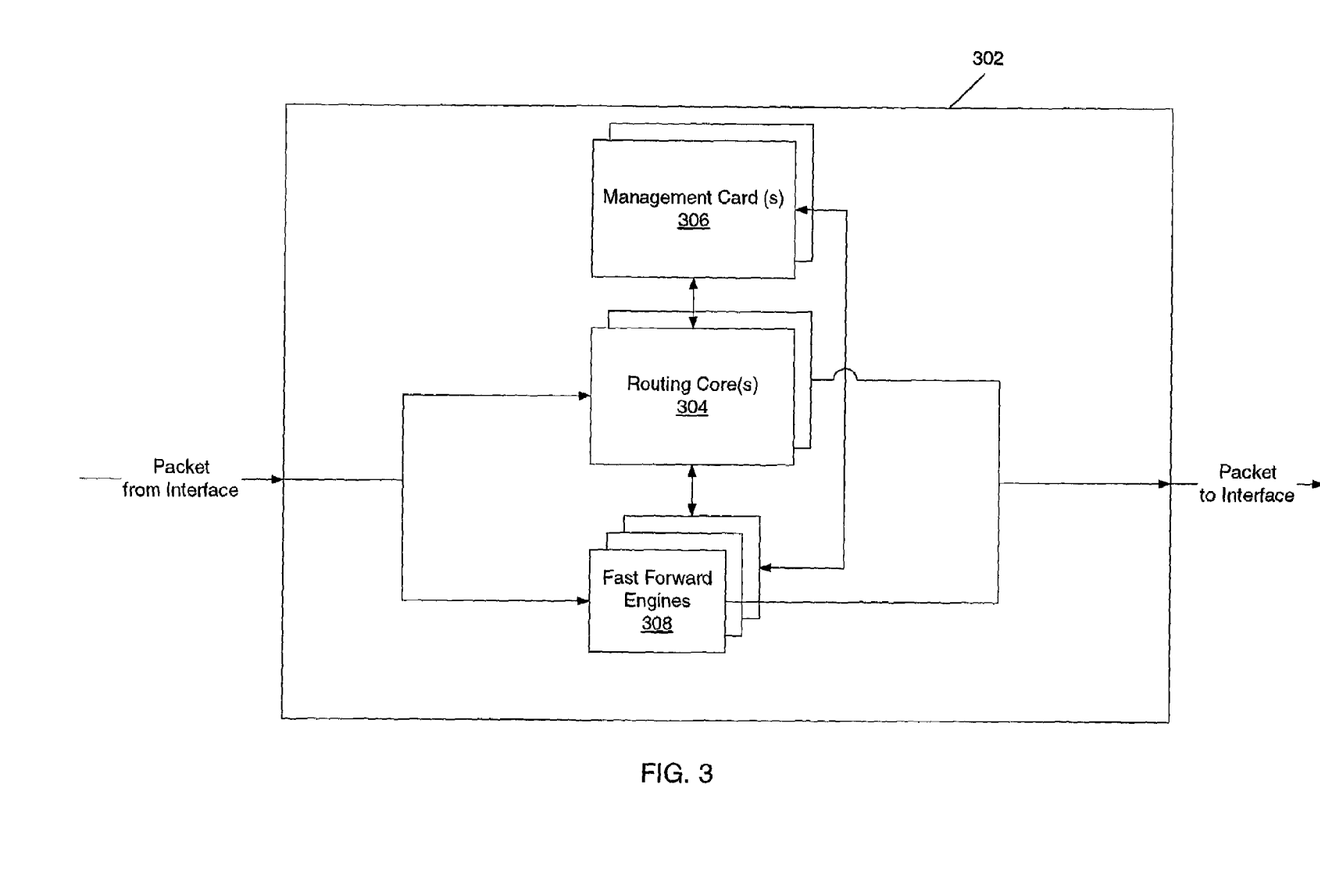
FIG. 3 is a schematic block diagram of a routing logic unit of the routing device of FIG. 2 in accordance with an embodiment of the invention.

As mentioned, forwarding decisions for a packet are made by a routing logic unit 202. FIG. 3 is a schematic block diagram of a routing logic unit of the routing device in FIG. 2 in accordance with an embodiment of the invention. Routing logic unit 302 includes at least one routing core 304, at least one management card 306 and a plurality of fast forward engines 308. Management card 306 is used to control various tasks of the routing logic unit 302 as well as the router 200 (shown in FIG. 2). In one embodiment, the management card may be a PCMCIA card with the following characteristics: flash, a hard disk drive, an Ethernet port, a console port and a modem port. Typically, management card 306 is responsible for tasks such as system configuration, system maintenance and booting the system.

The routing logic unit 302 also includes a plurality of fast forward engines 308. Each fast forward engine 308 includes a forwarding table that is updated by a Routing Table Manager (RTM) (shown in FIG. 4) in the routing core 304. A forwarding table is stored in memory on each fast forward engine 308 card. When a data packet is received by router 200, an interface controller card 206 (shown in FIG. 2) will direct the data packet to a fast forward engine 308 in the routing logic unit 302. The fast forward engine 308 will then look up the destination (or next hop) of the packet in its forwarding table. Once the destination is determined, the packet is sent to the appropriate interface card 208 (shown in FIG. 2) for forwarding. Routing information and packets that miss the fast forward engine lookup are forwarded to the routing core 304.

Figure 4:
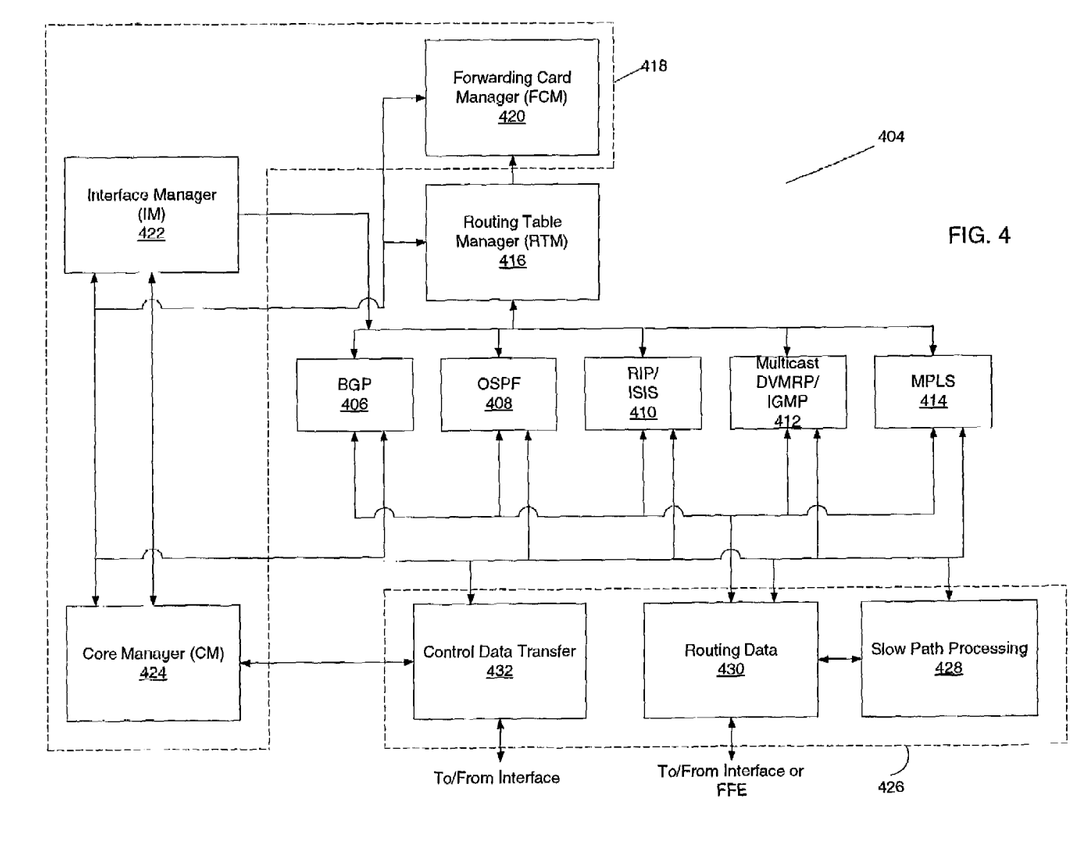
FIG. 4 is a schematic block diagram of a routing core architecture for a routing logic unit as shown in FIG. 3, in accordance with an embodiment of the invention.

FIG. 4 is a schematic block diagram of a routing core architecture for a routing logic unit as shown in FIG. 3 in accordance with an embodiment of the invention. The functions of the routing core 404 are advantageously distributed over a plurality of processors. In particular, a separate processor (406-414) is used for each routing protocol supported by the router. As shown in FIG. 4, the routing protocols may include, for example, Border Gateway Protocol (BGP) 406, Open Shortest Path First (OSPF) 408, Routing Information Protocol (RIP)/Intermediate System-to-Intermediate System (ISIS) 410, multicast routing protocols such as Distance Vector Multicast Routing Protocol (DVMRP) 412 and Internet Group Management Protocol (IGMP) 412 and a label switching protocol such as Multiprotocol Label Switching (MPLS) 414. Each routing protocol processor (406-414) includes an operating system, an IP stack and memory space including RAM, cache memory for fast processing and inboard memory for queuing. The operating system used in each routing protocol processor may be, for example, FreeBSD or VxWorks. In one embodiment, the routing protocol processors are Power PC 750 processors. By distributing the routing tasks over a number of processors and therefore a larger amount of dedicated memory space, the need for resource contention is reduced. In addition, upgrades may be done to individual parts of the routing core or to the whole. For example, if a BGP feature needs to be added, only the BGP routing processor 406 needs to be updated and will not affect the traffic flow through the other routing protocol processors.

Each routing protocol processor is responsible for gathering route information from its peers or interface connections. Typically, a routing protocol gathers route information by exchanging update messages with peers throughout a network. A routing protocol processor, such as BGP processor 406, uses the route information to build a table of routes (or next hops) known to the routing protocol. The table of routes is stored in the memory space of the routing protocol processor. As route information is received by the router, it is directed to a routing data processor 430 in the routing core 404 that determines the routing protocol associated with the route information and passes the route information to the appropriate routing protocol processor. The routing data processor 430 may determine the correct routing protocol by, for example, looking at a header associated with the route information.

Routing core 404 also includes a Routing Table Manager (RTM) 416 coupled to the routing protocol processors (406-414). RTM 416 receives information regarding routes from each routing protocol processor and maintains a forwarding table including routes from all the supported routing protocols. The route information received by the RTM may include whether to add, delete or update a particular route. When a routing protocol is ready to submit its route updates to the RTM 416, the routing protocol may send a message to the RTM 416 with a list of route changes via high speed messaging. RTM 416 also determines the best routes from each routing protocol and indicates such in the forwarding table.

In one embodiment, the RTM 416 is implemented on a separate processor. The RTM 416 processor includes an operating system and a memory space. The forwarding table maintained by the RTM 416 and any changes to be made to the forwarding table are stored in its memory space. The format of the changes to the routing table may include the routing protocol associated with the particular route, the next hop, the IP address and a flag indicating the action to be taken (i.e., add, remove or change) for a particular route.

The forwarding table of the RTM 416 corresponds to the forwarding tables stored on the fast forward engines 308 (shown in FIG. 3). The RTM 416 will dynamically update the fast forward engine 308 forwarding tables with any changes to the forwarding table. When the RTM 416 has determined the changes to the forwarding table based on the information received from the routing protocol processors, the RTM 416 sends a message to a Forwarding Card Manager (FCM) 420 with the location of the changes for the forwarding table in the fast forward engines. The FCM 420 will then send an update message (e.g., add, delete or change) to the fast forward engines via the routing data processor 430. In one embodiment, the forwarding tables of the fast forward engines are updated simultaneously.

Routing core 404 also includes a control data transfer block 432 and a slow path processing block 428. In a preferred embodiment, the functions of control data transfer 432 and slow path processing 428 are implemented on the same processor 426 as the routing data processor 430. The control data transfer block 432 receives control messages from an interface controller 206 (shown in FIG. 2) and forwards the messages to a core manager 424. The control messages are advantageously handled on a separate bus than the routing information that is sent to the routing data processor 430.

The core manager 424 interfaces between all of the processors in the routing core 404 and the management cards 306 (shown in FIG. 3). The core manager 404 handles a plurality of tasks including interface changes, communication with the management cards and forwarding card updates. When a management card makes a request, the core manager 424 will gather the requested information (e.g., statistics or alarms) and provide it to the management card 306.

The slow path processing block 428 is responsible for handling data packets that were not able to find a route (or next hop) using the fast forward engines. The slow path processor block 428 may search through each routing protocol routing table that is stored in the memory of each routing protocol processor (406-414) in order to determine a route for a particular data packet.

An Interface Manager (IM) 422 is coupled to the core manager 424 and the routing protocol processors (406-414). The interface manager 422 receives messages from the interface controllers 206 (shown in FIG. 2) regarding any changes to the interfaces such as port up/down, cards up/down and PPP state. When a change message is received by the interface manager 422, it will determine the protocol(s) running on the particular interface affected and send the information regarding the changes to the appropriate routing protocol processor(s) as well as the core manager 424. Each routing protocol processor reports to the interface manager 422 the interfaces it is currently using. In one embodiment, the forwarding card manager 420, interface manager 422 and core manager 424 are implemented on the same processor 418.

As discussed, embodiments of the present invention provide a routing device with a distributed routing core. The routing core advantageously distributes various routing functions over a plurality of processors (e.g., each routing protocol is implemented on a separate processor). This architecture reduces bottlenecks in routing decisions and allows for the scalability of the routing device to meet the demands of the communication system.

The present invention may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or other means including any combination thereof.

Computer program logic implementing all or part of the functionality previously described herein may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (eg., an object code, an assembly language, or a high level language such as Fortran, C, C++, JAVA, or HTML) for use with various operating systems or operating environments. The source code may define and use various data structures and communication messages. The source code may be in computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, EEPROM, or Flash-programmable RAM), a magnetic memory device (e.g., a diskette or fixed disk), an optical memory device (e.g., a CD-ROM), or other memory device. The computer program may be fixed in any form in a signal that is transmittable to a computer using any of various communication technologies, including, but in no way limited to, analog technologies, digital technologies, optical technologies, wireless technologies, and internetworking technologies. The computer program may be distributed in any form as a removable medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the functionality previously described herein may be designed using traditional manual methods, or may be designed, captured, simulated, or documented electronically using various tools, such as Computer Aided Design (CAD), a hardware description language (e.g., VHDL or ADL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies, networking technologies, and internetworking technologies. The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Although various exemplary embodiments of the invention have been disclosed, it should be apparent to those skilled in the art that various changes and modifications can be made that will achieve some of the advantages of the invention without departing from the true scope of the invention. These and other obvious modifications are intended to be covered by the appended claims.

What is claimed is:

1. A routing device for forwarding data packets in a communication system, the routing device comprising:
   at least one interface for receiving and transmitting data packets;
   a set of routing processors disposed on a single card coupled to the at least one interface, including a first routing processor exclusively associated with a first routing protocol for determining a set of routes, and a second routing processor exclusively associated with a second routing protocol for determining a set of routes; and
   a routing table manager coupled to the set of routing processors, for maintaining a forwarding table of routes provided by the set of routing processors.

2. A routing device according to claim 1, further including a set of fast forward engines coupled to the at least one interface and the routing table manager for forwarding a data packet based on the forwarding table.

3. A routing device according to claim 1, wherein the routing table manager is exclusively associated with a third processor.

4. A routing device according to claim 3, wherein the routing table manager processor includes memory in which the forwarding table may be stored.

5. A routing device according to claim 1, wherein each routing processor includes memory.

6. A routing device according to claim 1, further including a memory that includes RAM, cache memory and queue memory.

7. A routing device according to claim 1, further including: a control data module coupled to the at least one interface for receiving and processing control data messages from a control data bus; and a routing data module coupled to the at least one interface and the set of routing processors for receiving and processing routing data messages from a routing data bus.

8. A routing device according to claim 7, wherein the control data module and the routing data module are implemented on the same processor.

9. An apparatus for aggregating and maintaining routing information for a routing device that forwards data packets in a communication system, the apparatus comprising:
   an input for receiving routing information associated with a set of routing protocols;
   a set of routing protocol processors disposed on a single card coupled to the input, including a first routing protocol processor exclusively associated with a first routing protocol from the set of routing protocols for determining a set of routes for the first routing protocol, and a second routing protocol processor exclusively associated with a second routing protocol from the set of routing protocols for determining a set of routes for the second routing protocol; and
   a forwarding table coupled to the set of routing protocol processors for maintaining a list of routes provided by the set of routing protocol processors.

10. An apparatus according to claim 9, further including a routing table manager coupled to the set of routing protocol processors for updating the forwarding table.

11. An apparatus according to claim 10, wherein the routing table manager is exclusively associated with a third processor.

12. An apparatus according to claim 9, wherein each routing protocol processor includes memory.

13. An apparatus according to claim 12, wherein the memory includes RAM, cache memory and queue memory.

14. A communication system comprising at least one routing device, the routing device for forwarding data packets in a communication system, the routing device comprising:
   at least one interface for receiving and transmitting data packets;
   a set of routing processors disposed on a single card coupled to the at least one interface, including a first routing processor exclusively associated with a first routing protocol for determining a set of routes, and a second routing processor exclusively associated with a second routing protocol for determining a set of routes; and
   a routing table manager coupled to the set of routing processors, for maintaining a forwarding table of routes provided by the set of routing processors.

15. A communication system according to claim 14, wherein the routing device further includes a set of fast forward engines coupled to the at least one interface and the routing table manager for forwarding a data packet based on the forwarding table.

16. A communication system according to claim 14, wherein the routing table manager is exclusively associated with a third processor.

17. A communication system according to claim 14, wherein the routing device further includes: a control data module coupled to the at least one interface for receiving and processing control data messages from a control data bus; and a routing data module coupled to the at least one interface and the set of routing processors for receiving and processing routing data messages from a routing data bus.

18. A communication system according to claim 17, wherein the control data module and the routing data module are implemented on the same processor.

19. A communication system according to claim 14, wherein each routing processor includes memory.

\* \* \* \* \*